United States Patent
Lum et al.

(10) Patent No.: US 7,128,558 B2
(45) Date of Patent: Oct. 31, 2006

(54) POST-FORMING OF THERMOPLASTIC DUCTS

(75) Inventors: Matthew K. Lum, Mercer Island, WA (US); Albert E. Seifert, Seattle, WA (US); Robert G. Shaw, II, Nine Mile Falls, WA (US); Mark L. Younie, Mill Creek, WA (US)

(73) Assignee: The Boeing Company, Seattle, WA (US)

( * ) Notice: Subject to any disclaimer, the term of this patent is extended or adjusted under 35 U.S.C. 154(b) by 448 days.

(21) Appl. No.: 10/215,780

(22) Filed: Aug. 9, 2002

(65) Prior Publication Data

US 2004/0026819 A1    Feb. 12, 2004

(51) Int. Cl.
*B29C 57/02* (2006.01)
(52) U.S. Cl. .................. 425/326.1; 425/327; 425/384; 425/393; 425/DIG. 218
(58) Field of Classification Search ............. 425/326.1, 425/327, 369, 392–394, 384, DIG. 218
See application file for complete search history.

(56) References Cited

U.S. PATENT DOCUMENTS 3,843,302 A * 10/1974 Petzetakis .................. 425/393
4,008,028 A   2/1977 Ronden et al.
4,068,622 A   1/1978 Vola (Continued)

FOREIGN PATENT DOCUMENTS

DE    3542048 A1 *  6/1987
DE    4344798 A1 *  6/1995
GB    1124930       8/1968

(Continued)

OTHER PUBLICATIONS

CETEX® Application in Ducting; Ten Cate Advanced Composites Technical Document Nr ITD5235.017; Oct. 1990; pp. 1-10; Nijverdal, The Netherlands.

(Continued)

*Primary Examiner*—Yogendra N. Gupta
*Assistant Examiner*—Thu Khanh T. Nguyen
(74) *Attorney, Agent, or Firm*—Alston & Bird LLP

(57) ABSTRACT

An apparatus and method are provided for thermoplastically forming a contour in a thermoplastic duct defining a passage. The apparatus includes a longitudinal collar that defines a cavity and a rigid inner support structure extending longitudinally in the cavity. The collar and/or the inner support structure define a mold contour. One or more heaters are configured to heat at least a formation portion of the duct to a formation temperature. An expansion member, such as an expandable elastomer, which is disposed between an inner surface of the collar and an outer surface of the inner support structure, is configured to urge the formation portion of the duct against the mold contour to thermoplastically form the duct.

8 Claims, 14 Drawing Sheets

U.S. PATENT DOCUMENTS

| | | | |
|---|---|---|---|
| 4,113,813 A | * | 9/1978 | Wilson .............. 425/DIG. 218 |
| 4,283,448 A | | 8/1981 | Bowman |
| 4,315,630 A | | 2/1982 | French et al. |
| 4,510,013 A | * | 4/1985 | Lupke et al. ................ 425/393 |
| 4,559,765 A | | 12/1985 | Cress et al. |
| 4,942,904 A | * | 7/1990 | Kacza et al. ................ 425/393 |
| 5,225,016 A | | 7/1993 | Sarh |
| 5,505,813 A | | 4/1996 | Scheifele et al. |
| 5,635,014 A | | 6/1997 | Taylor |
| 5,743,811 A | | 4/1998 | Bird |
| 5,951,929 A | | 9/1999 | Wilson |
| 6,284,089 B1 | | 9/2001 | Anderson et al. |
| 6,826,943 B1 | * | 12/2004 | Rempe et al. ........... 72/370.06 |
| 6,861,026 B1 | * | 3/2005 | Holtstrand .................. 264/573 |

FOREIGN PATENT DOCUMENTS

| | | | |
|---|---|---|---|
| GB | | 1258605 | 12/1971 |
| GB | | 1394317 | 5/1975 |
| JP | | 02011233 A * | 1/1990 |
| NL | | 7104137 | 9/1972 |

OTHER PUBLICATIONS

A short note on Duct Manufacturing for Aircraft Environmental Control Systems using CETEX Continuous fiber reinforced thermoplastic; Ten Cate Advanced Composites Technical Document Nr ITD5241.002; 1992; pp. 1-6; Nijverdal, The Netherlands.

* cited by examiner

POST-FORMING OF THERMOPLASTIC DUCTS

BACKGROUND OF THE INVENTION

1) Field of the Invention

The present invention relates to apparatuses and methods for forming thermoplastic materials and, more specifically, for post-forming features in thermoplastic ducts.

2) Description of Related Art

Ducts provide transport passageways for a wide variety of applications. For example, tubular ducts are widely used for air flow in aircraft environmental control systems. Similarly, ducts provide passageways for transporting gases for heating and ventilation in other vehicles and in buildings. Water distribution systems, hydraulic systems, and other fluid networks also often use ducts for fluid transport. In addition, solid materials, for example, in particulate form can be delivered through ducts. Ducts for the foregoing and other applications can be formed of metals, plastics, ceramics, composites, and other materials.

One conventional aircraft environmental control system utilizes a network of ducts to provide air for heating, cooling, ventilation, filtering, humidity control, and/or pressure control of the cabin. In this conventional system, the ducts are formed of a composite material that includes a thermoset matrix that impregnates, and is reinforced by, a reinforcing material such as Kevlar®, registered trademark of E. I. du Pont de Nemours and Company. The thermoset matrix is typically formed of an epoxy or polyester resin, which hardens when it is subjected to heat and pressure. Ducts formed of this composite material are generally strong and lightweight, as required in many aircraft applications. However, the manufacturing process can be complicated, lengthy, and expensive, especially for ducts that include contours or features such as beads and bells. For example, in one conventional manufacturing process, ducts are formed by forming a disposable plaster mandrel, laying plies of fabric preimpregnated with the thermoset material on the mandrel, and consolidating and curing the plies to form the duct. The tools used to mold the plaster mandrel are specially sized and shaped for creating a duct of specific dimensions, so numerous such tools must be produced and maintained for manufacturing different ducts. The plaster mandrel is formed and destroyed during the manufacture of one duct, requiring time for curing and resulting in plaster that typically must be removed or destroyed as waste. Additionally, the preimpregnated plies change shape during curing and consolidation and, therefore, typically must be trimmed after curing to achieve the desired dimensions. The jigs required for trimming and for locating the proper positions for features such as holes and spuds are also typically used for only a duct of particular dimensions, so numerous jigs are required if different ducts are to be formed. Like the rotatable tools used for forming the mandrels, the jigs require time and expense for manufacture, storage, and maintenance. Additionally, ducts formed of conventional thermoset epoxies typically do not perform well in certain flammability, smoke, and toxicity tests, and the use of such materials can be unacceptable if performance requirements are strict.

Features such as beads typically must be post-formed, or added after the formation of the duct, by disposing a fiberglass rope and/or additional plies on the outer surface of the duct and curing the rope and/or plies. This additional step requires additional manufacture time and labor, adding to the expense of the duct, and the additional materials add to the weight of the duct. As an alternative to post-forming, features can also be formed by providing a corresponding contour on the disposable mandrel, for example, by using a tapered mandrel to form a bell shape in the duct. However, this further complicates the process of preparing the mandrel. Also, the shape or size of the plies can change during curing, resulting in unpredictable changes to the placement of the feature.

Thus, there exists a need for an improved apparatus and method of forming features such as beads and bells in ducts. The method should not require the laying of individual plies on a disposable plaster mandrel. Preferably, the method should be compatible with thermoplastic ducts, including reinforced thermoplastic ducts formed from flat sheets, which provide high strength-to-weight ratios and meet strict flammability, smoke, and toxicity standards. Further, the method should preferably not require the addition of added materials for forming the features.

SUMMARY OF THE INVENTION

The present invention provides an apparatus and method for thermoplastically forming contours in ducts. The ducts can be formed of a thermoplastic material, such as flat sheets of reinforced thermoplastic laminate, and the contour can be formed by post-forming the duct. Thus, individual plies need not be laid on a disposable plaster mandrel, and additional materials do not need to be added to the duct for forming the features. Additionally, the thermoplastic material can be lightweight, strong, and perform well in flammability, smoke, and toxicity tests. Further, the method is compatible with ducts that are formed by consolidation joining thermoplastic laminates.

According to one embodiment, the present invention provides an apparatus for thermoplastically forming a contour in a thermoplastic duct defining a passage. The apparatus includes a longitudinally extending collar with an inner surface that defines a cavity. An inner support structure, which can be rigid, extends longitudinally in the cavity and has an outer surface that opposes the inner surface of the collar. The collar and/or the inner support structure define a mold contour. An expansion member, which can be formed of an elastomeric material, is disposed between the inner and outer surfaces and partially or continuously around the inner support structure, such that the expansion member can urge a formation portion of the duct against the mold contour and thereby thermoplastically form the duct. Additionally, a heater can be configured to heat the formation portion of the duct to a formation temperature, and an alignment device can be configured to support the duct along a longitudinal axis collinear with that of the collar.

According to one aspect of the invention, the expansion member is configured to expand radially and urge the formation portion of the duct radially outward against the mold contour, which is defined by the inner surface of the collar. The mold contour can define a bead shape characterized by a continuous slot extending around the outer support. The inner support structure can define a channel for receiving the expansion member, and the channel can be adjustable in the longitudinal direction to compress the expansion member and urge the expansion member radially toward the mold contour. For example, the inner support structure can include a first portion with a face defining an aperture for receiving a second portion longitudinally, the face and the second portion defining the channel so that insertion of the second portion adjusts the width of the channel. An actuator can be provided for adjusting the portion(s) of the inner support structure to expand the expansion member. The expansion member can also be an inflatable bladder that is configured to receive a fluid for inflating so that the bladder expands radially outward from the channel and urges the formation portion of the duct toward the mold contour. According to another aspect, the expansion member is configured to urge the formation portion of the duct radially inward against the mold contour, which is defined by the outer surface of the inner support. For example, the inner support can define a tapered bell contour.

The expansion member can be formed of elastomeric material that expands when heated. A plurality of heaters can extend at least partially through the inner support structure, and one or more heaters can be positioned radially outside said cavity and configured to radiate heat radially inward to the duct. An insulative material can also be included proximate to the collar to retain heat in the cavity.

According to another aspect of the invention, the apparatus includes a rigid inner support structure that is configured to extend longitudinally in the passage of the duct and has an outer surface configured to correspond to a desired configuration of the duct. A heater assembly, such as a heater positioned within the inner support structure, is configured to heat a formation portion of the duct to at least a formation temperature. A heat shrinkable tape is configured to be disposed circumferentially on the formation portion of the duct. The outer surface of the inner support structure defines a mold contour and the heat shrinkable material is adapted to contract radially when heated and urge the formation portion of the duct radially inward against the mold contour to thermoplastically form the duct. Further, a consolidation joining head can be configured to adjust radially against an interface portion defined by longitudinal edges of the duct. The head urges the interface portion against the inner support, heats the interface portion to at least a glass transition temperature, and thereby consolidation joins the interface portion.

The present invention also provides a method of thermoplastically forming a contour in a thermoplastic duct. According to one embodiment, the method includes providing a thermoplastic duct between a collar and an inner support structure, for example, a cured thermoplastic duct formed of a reinforced thermoplastic composite material. A formation portion of the duct is heated to a formation temperature such as a glass transition temperature, and an expansion member is urged against the duct to thermoplastically form the formation portion of the duct radially against a mold contour defined by the collar and/or the inner support structure. Portion(s) of the collar can be separably adjusted to remove the duct therefrom.

The expansion member can be expanded radially outward or inward against the formation portion of the duct to urge the formation portion against the collar or inner support structure. According to one aspect of the invention, a longitudinal width of a channel can be adjusted to compress the expansion member in the longitudinal direction and expand the expansion member radially outward. For example, fluid can be delivered to an inflatable bladder to inflate the bladder and expand the bladder radially outward against the formation portion of the duct.

The duct can be heated by electrically energizing at least one resistive heater to generate heat and conducting the heat to the formation portion of the duct. The heat can also expand the expansion member radially to form the formation portion of the duct. Additionally, after heating the duct, and at least partially concurrent with the urging of the duct, the joint can be cooled to a temperature less than a glass transition temperature.

According to another aspect of the invention, a rigid inner support structure is configured to extend longitudinally in a passage of the duct such that a mold contour defined by an outer surface of the inner support structure and corresponding to a desired configuration of the duct is located proximate to a formation portion of the duct. Heat shrinkable tape is disposed circumferentially around the formation portion of the duct. The tape and at least a formation portion of the duct are heated to at least a formation temperature, such that the tape contracts radially inward urging the formation portion of the duct radially against the mold contour and thermoplastically forms the duct. Further, a consolidation joining head can be adjusted radially inward against an interface portion of the duct defined by longitudinal edges of the duct. The interface portion is thereby urged against the inner support and heated to at least a glass transition temperature, thus, consolidation joining the interface portion.

BRIEF DESCRIPTION OF THE DRAWINGS

Figure 1:
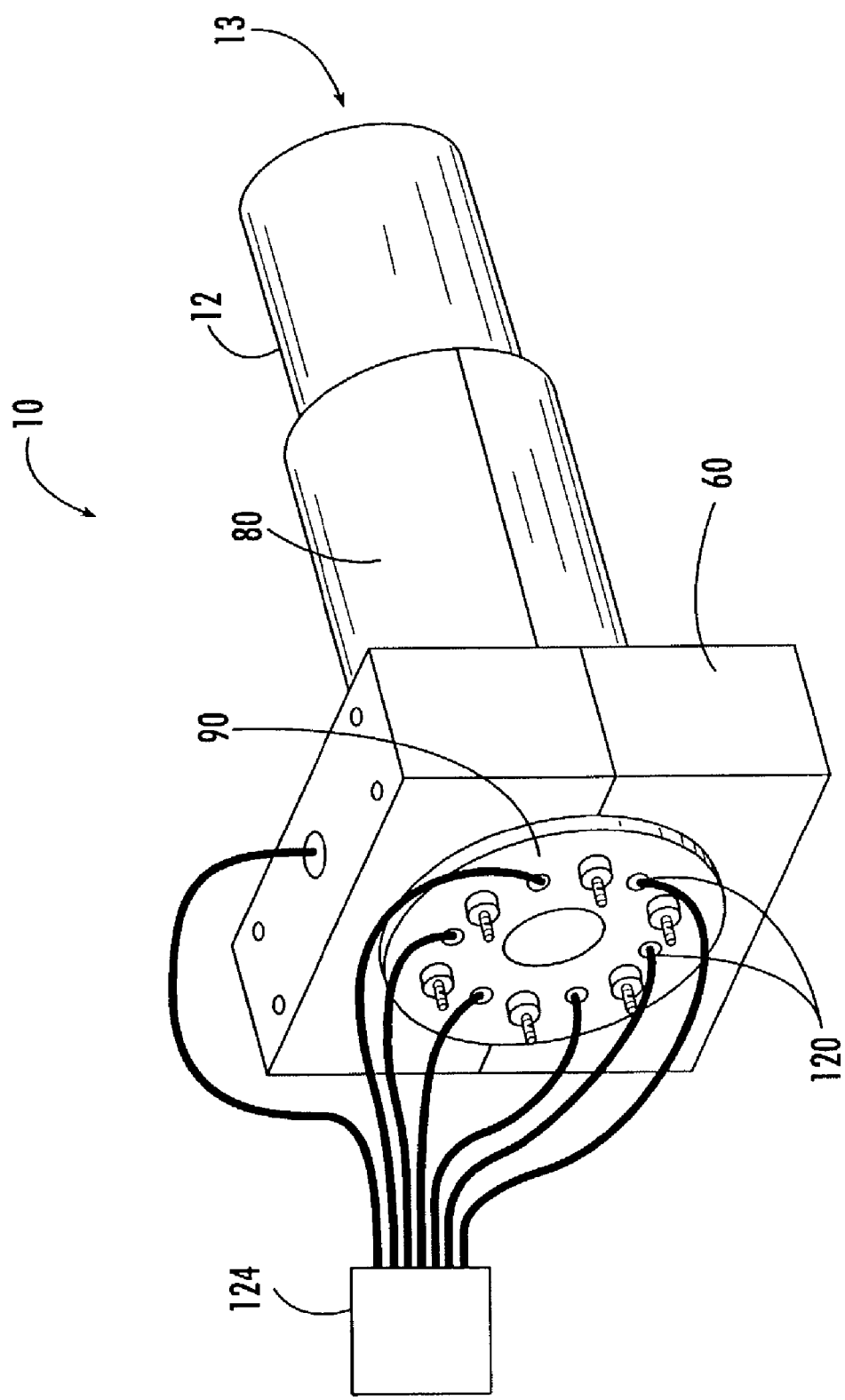
Figure 2:
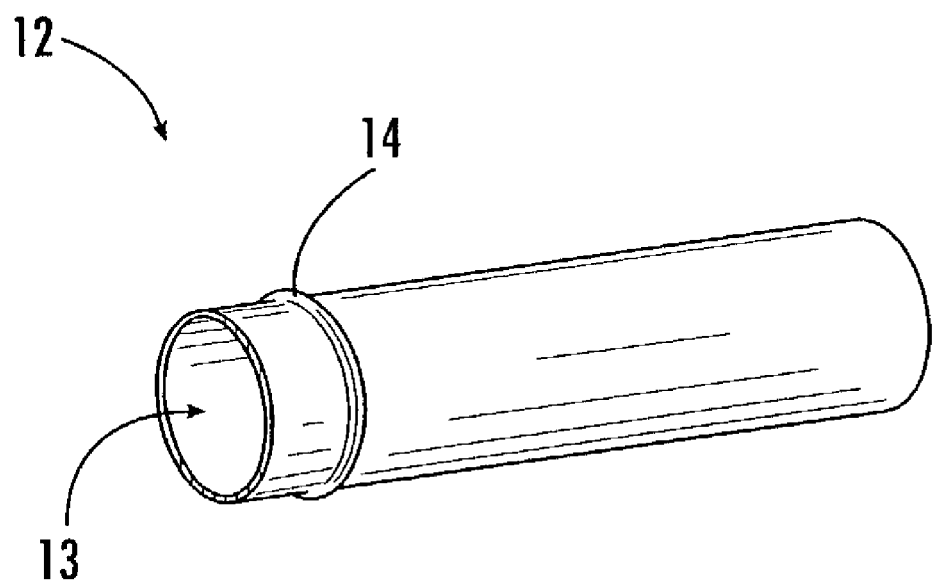
Figure 3:
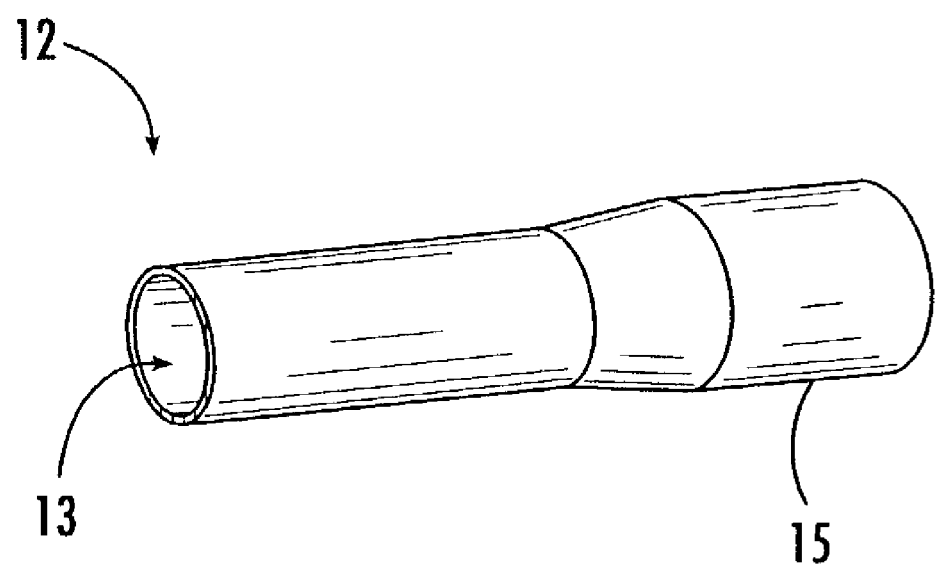
Figure 5:
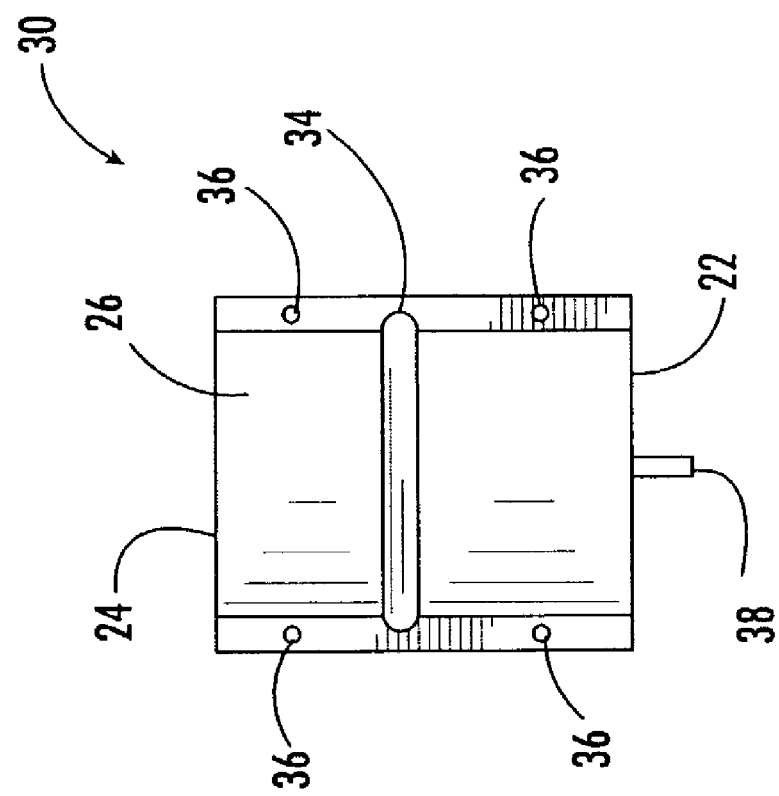
Figure 4:
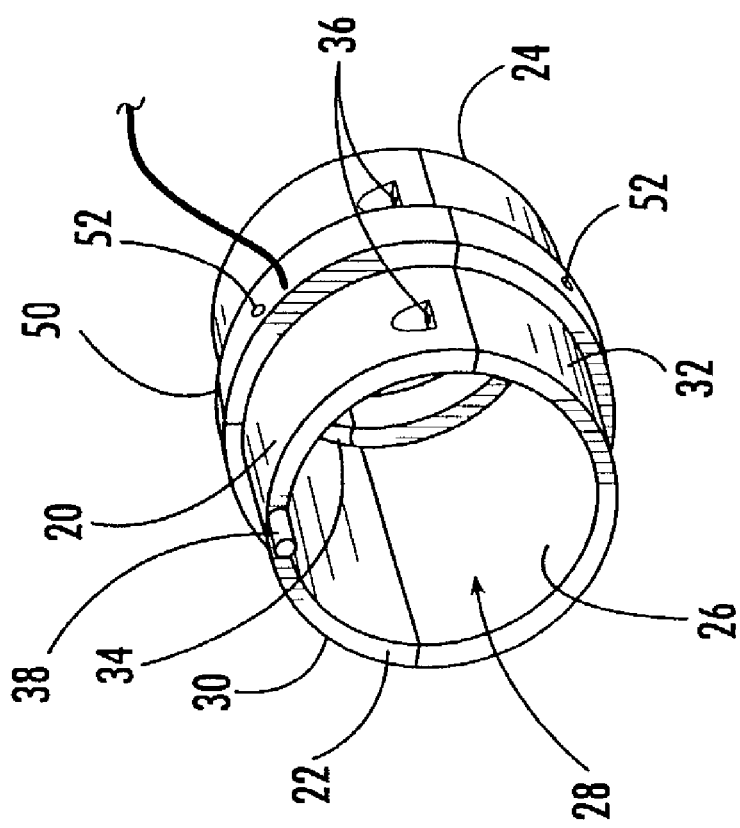
Figure 7:
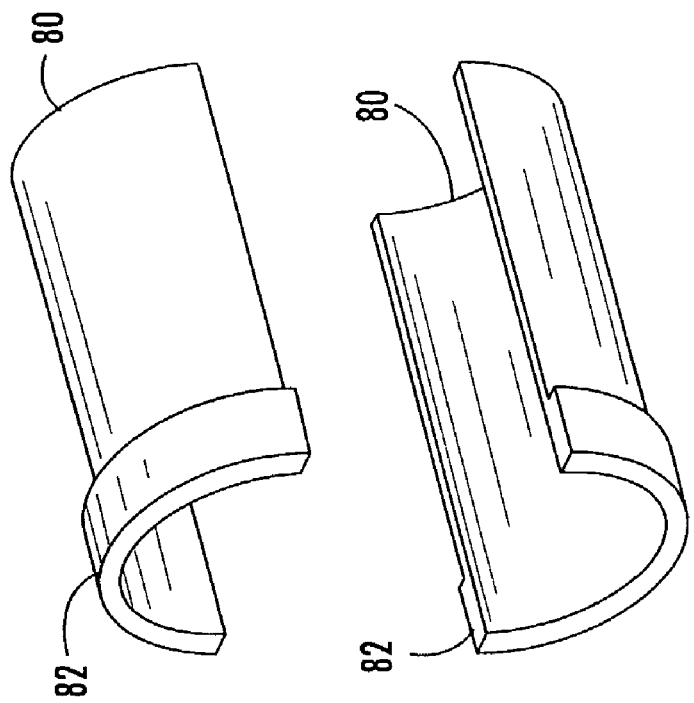
Figure 6:
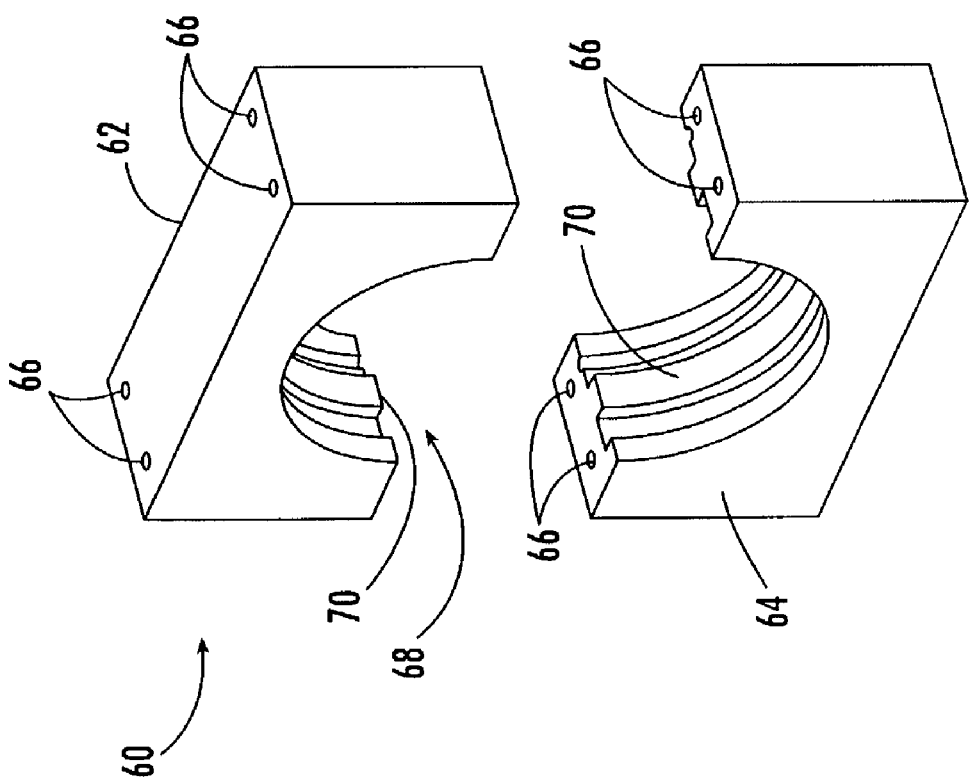
Figure 9:
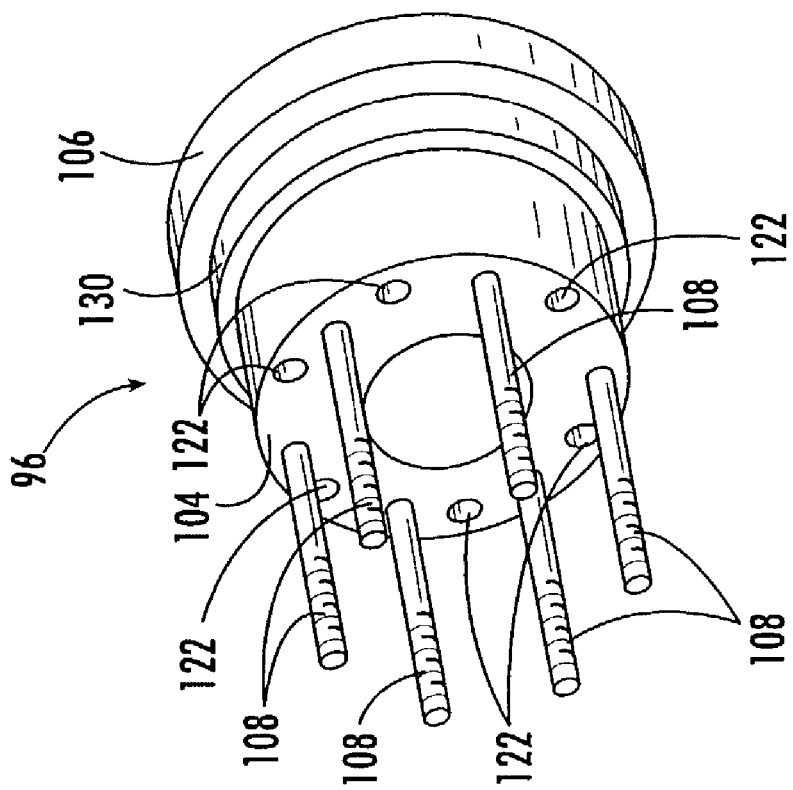
Figure 8:
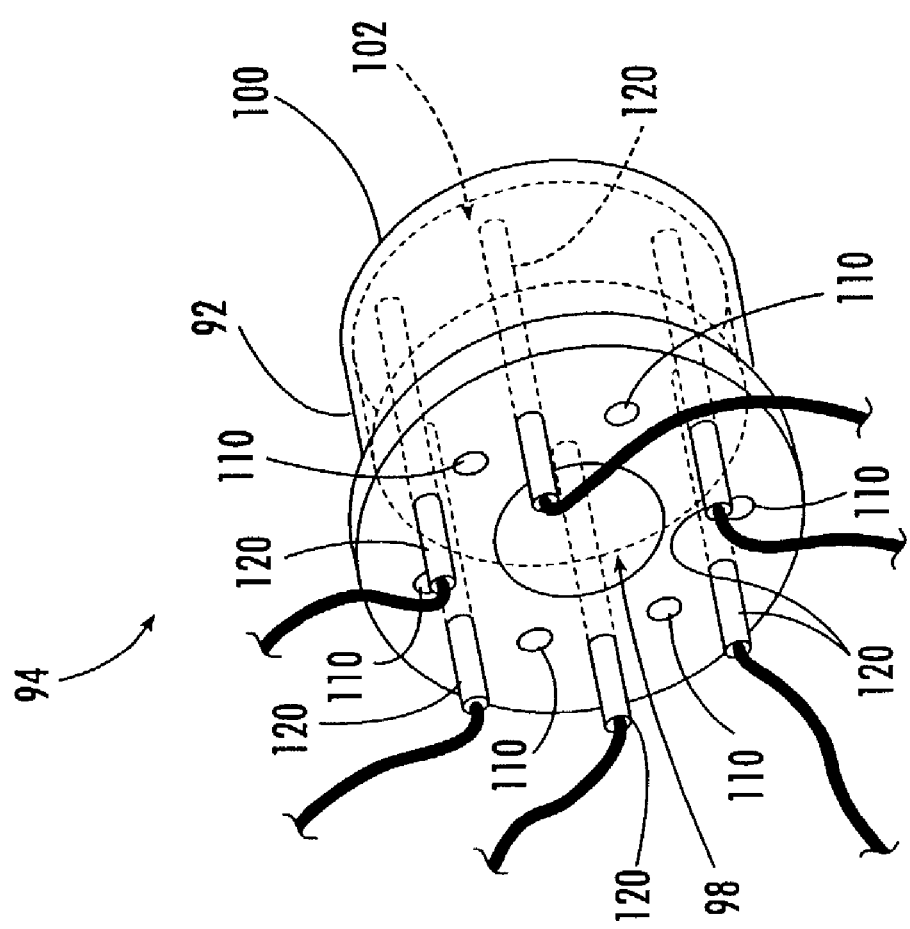
Figure 11:
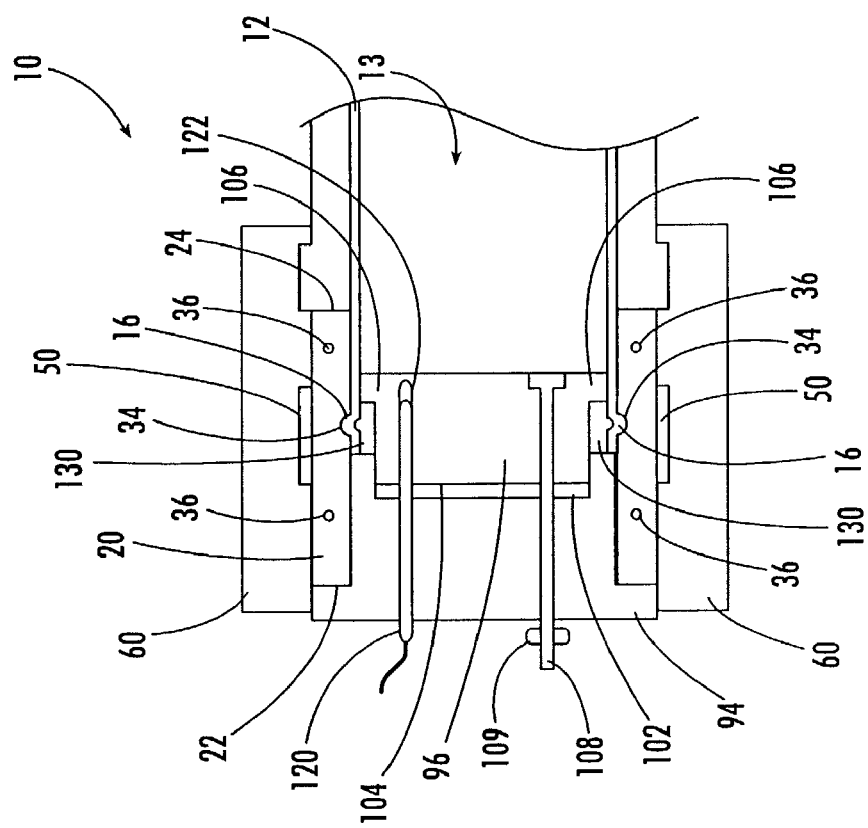
Figure 10:
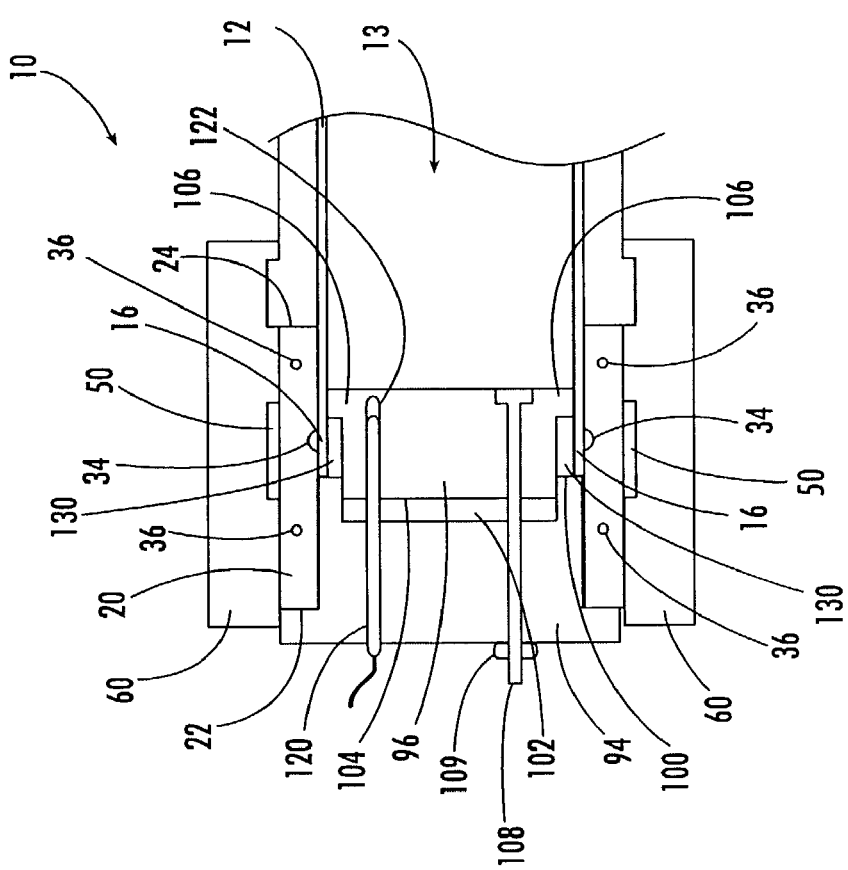
Figure 13:
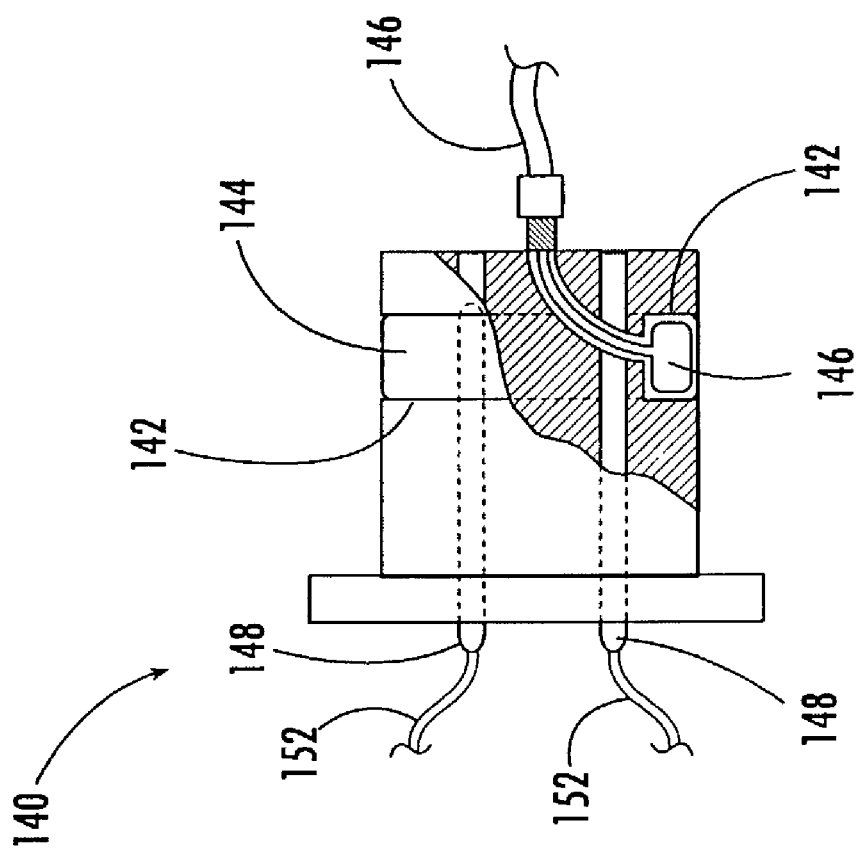
Figure 12:
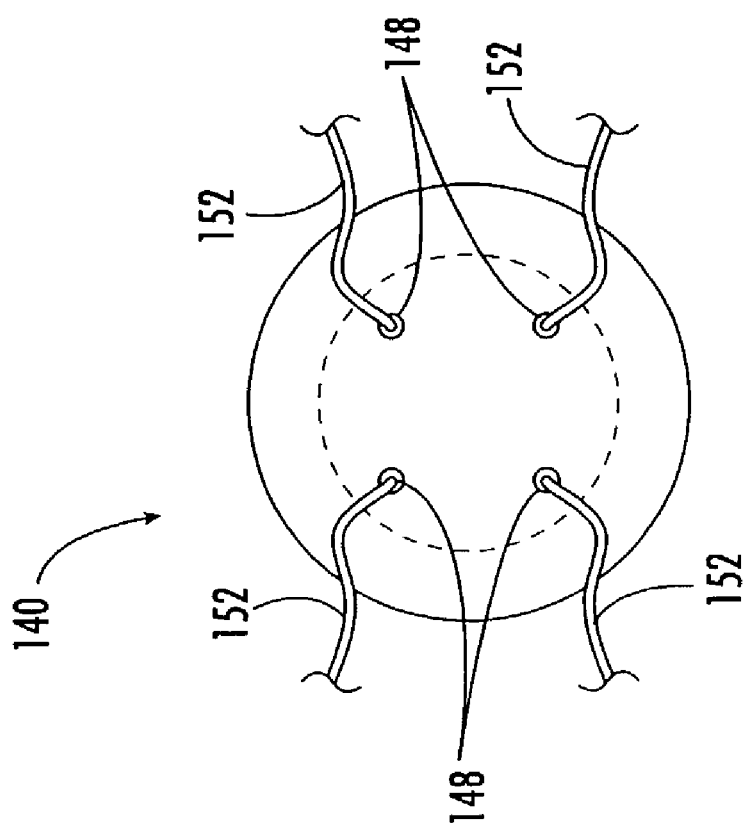
Figure 14:
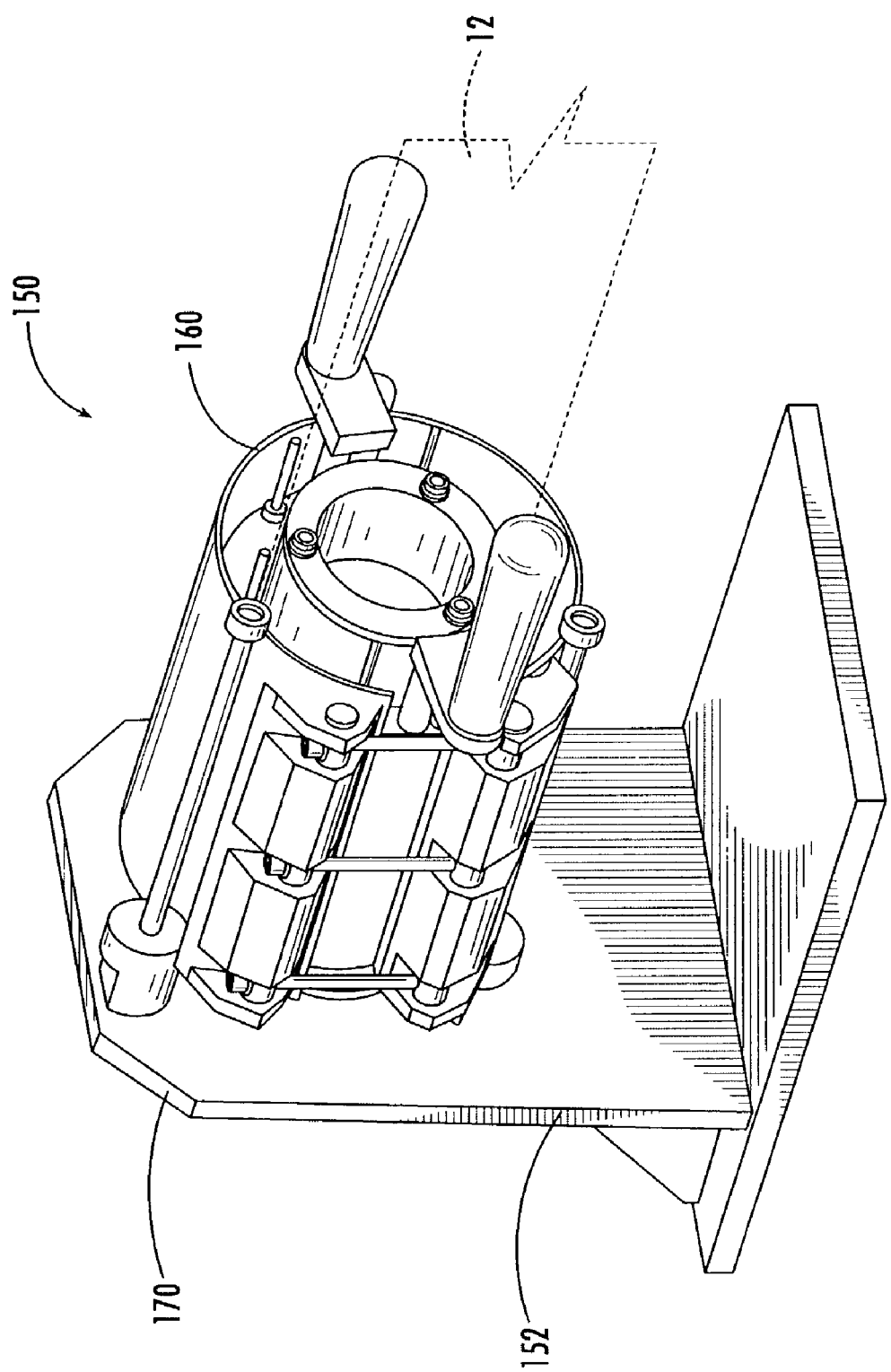
Figure 15:
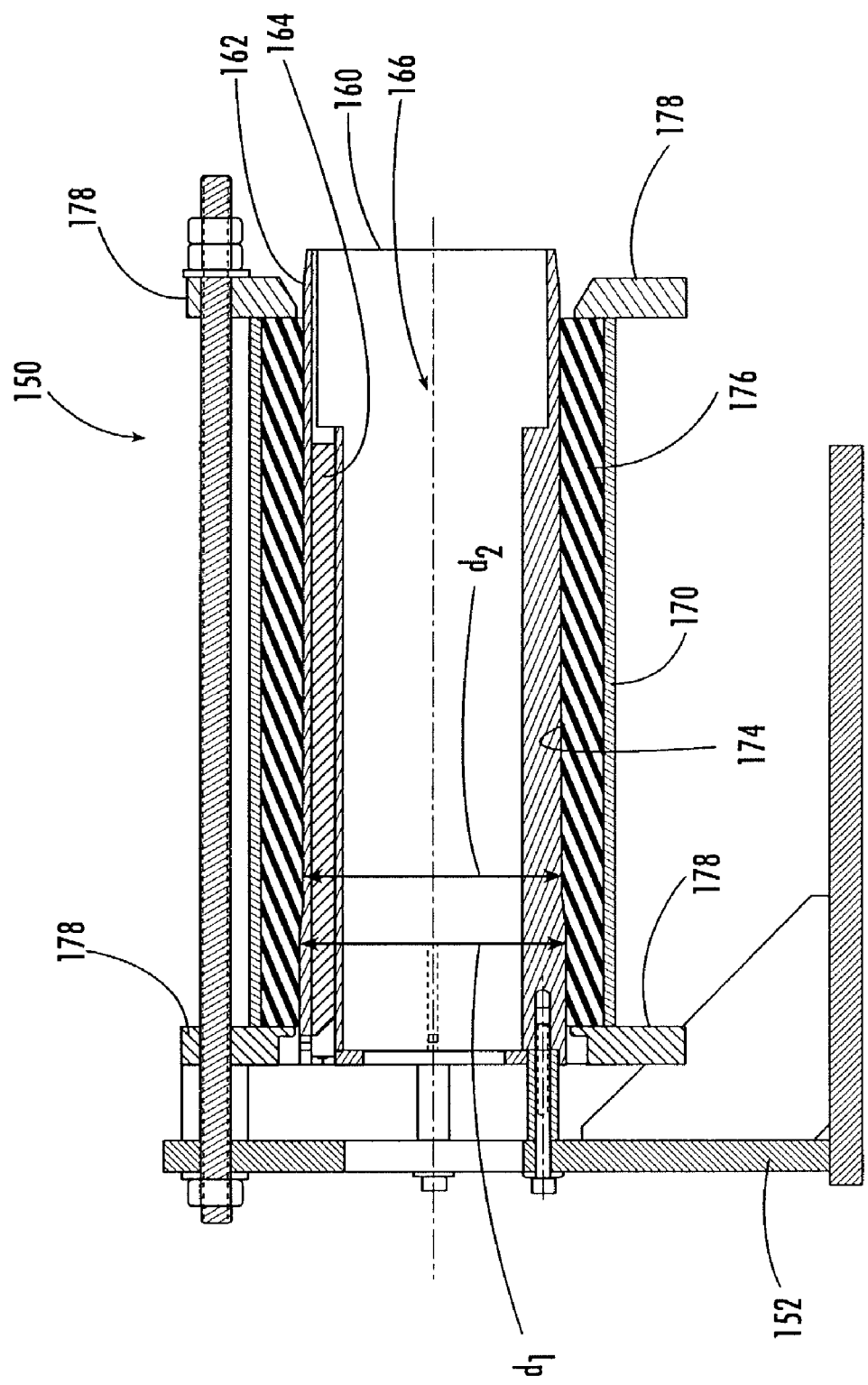
Figure 15A:
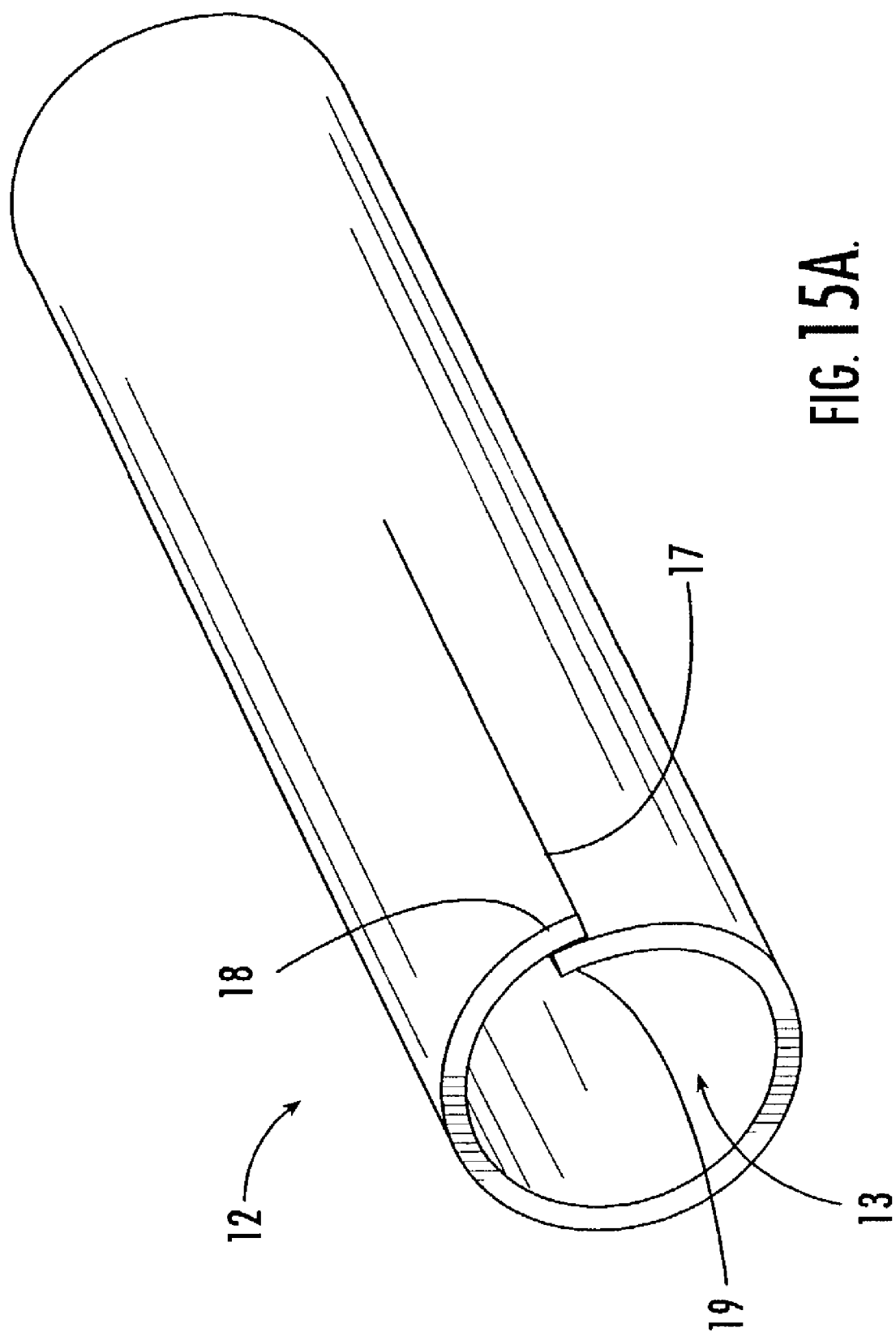
Figure 16:
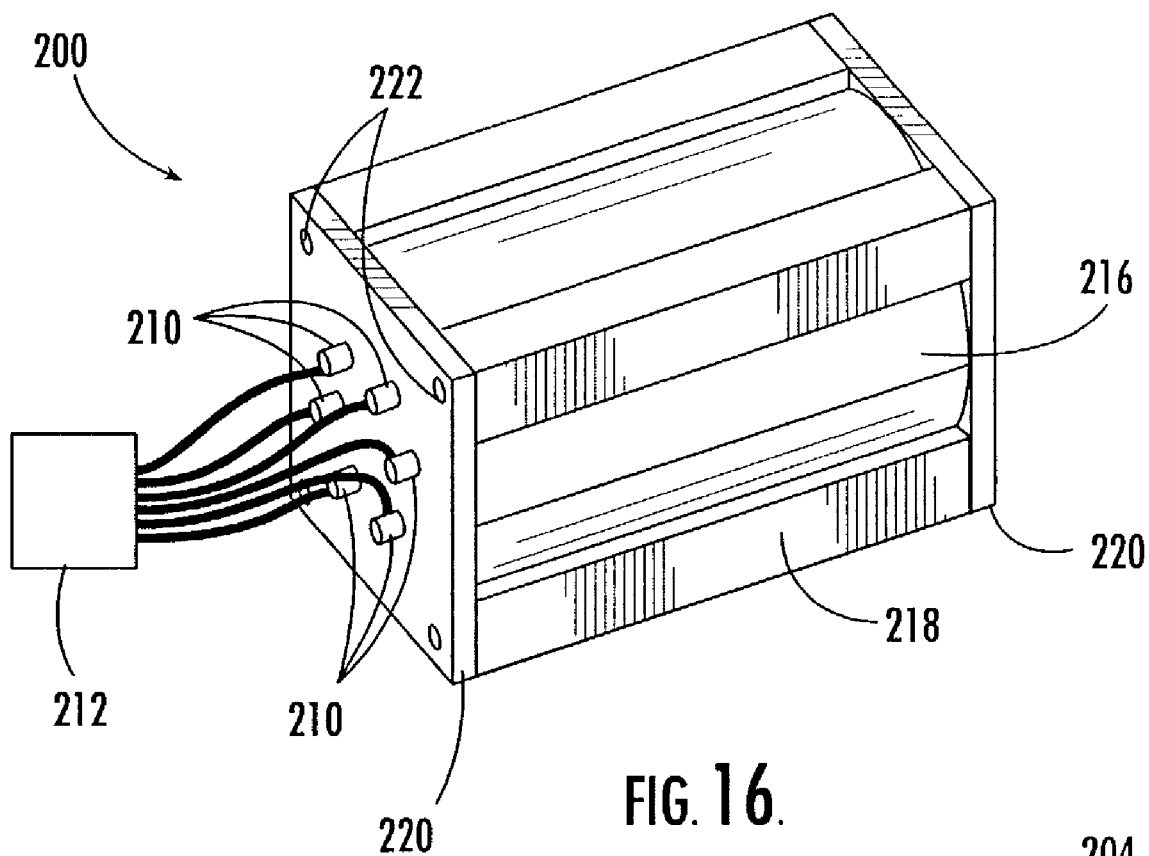
Figure 17:
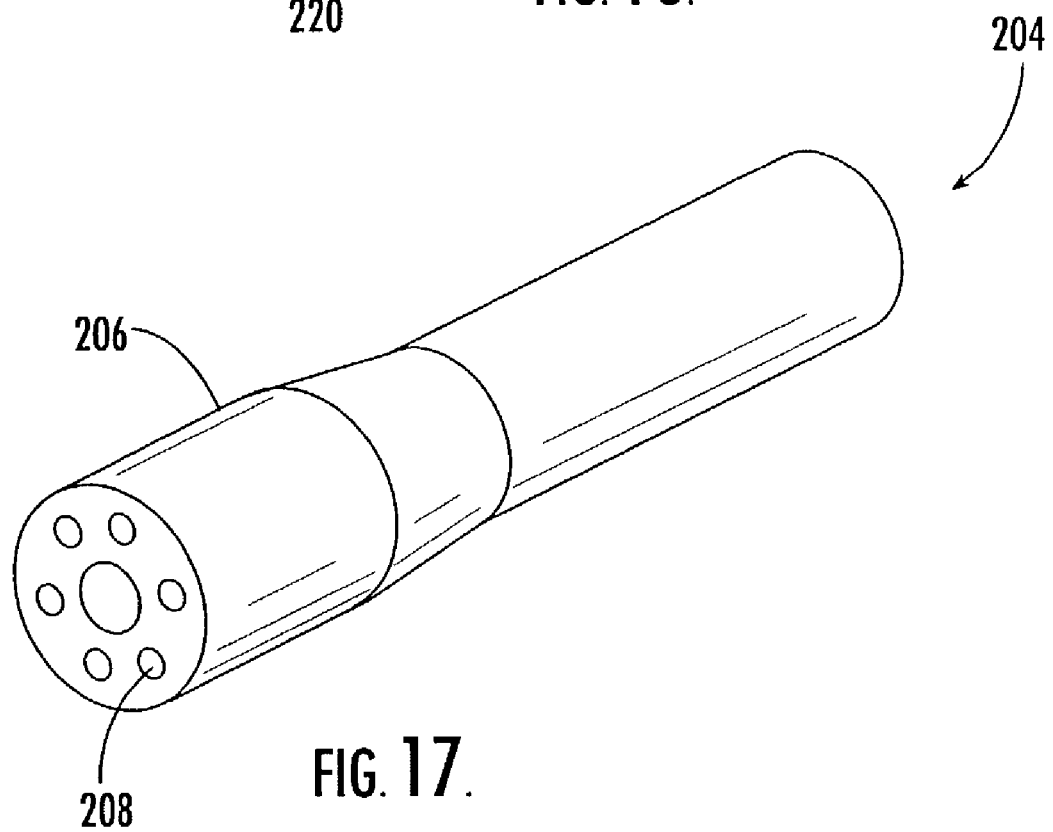
Figure 18:
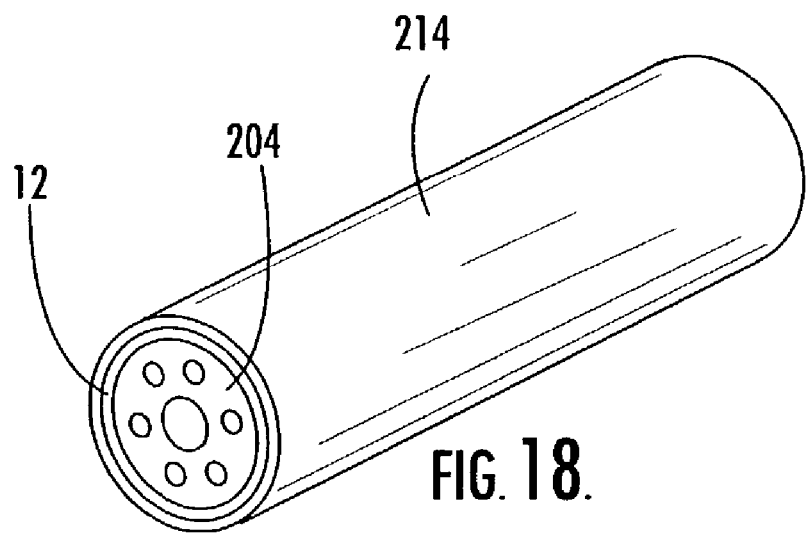
Figure 19:
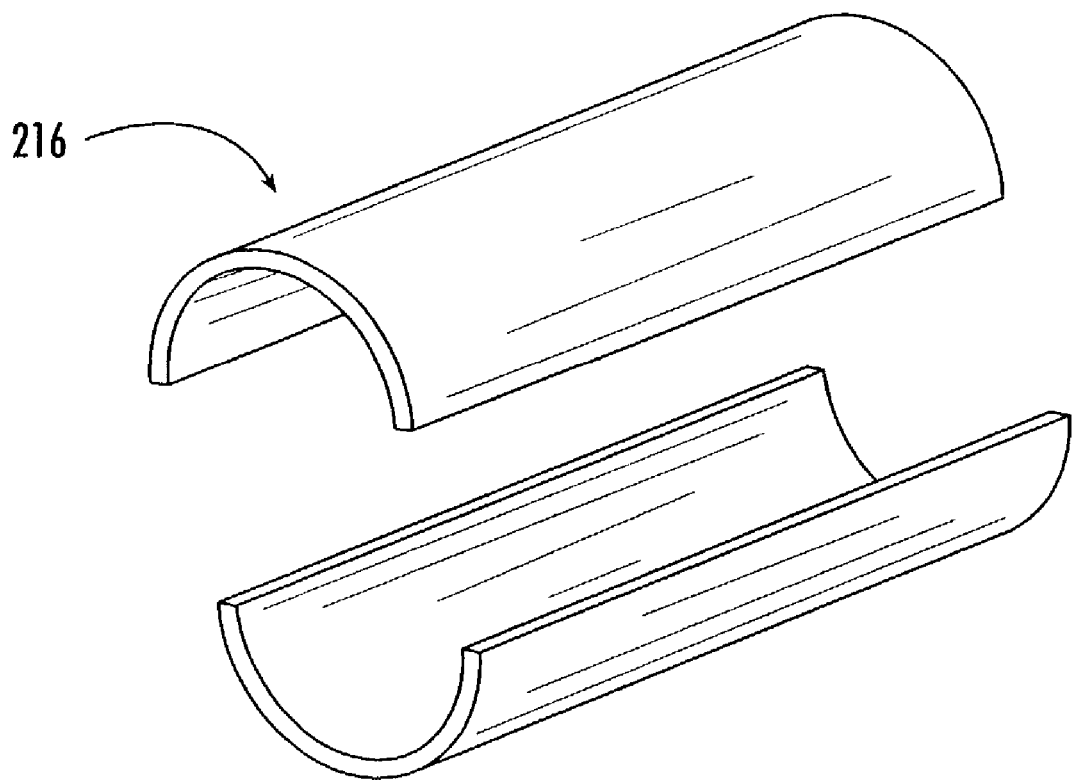
Figure 20:
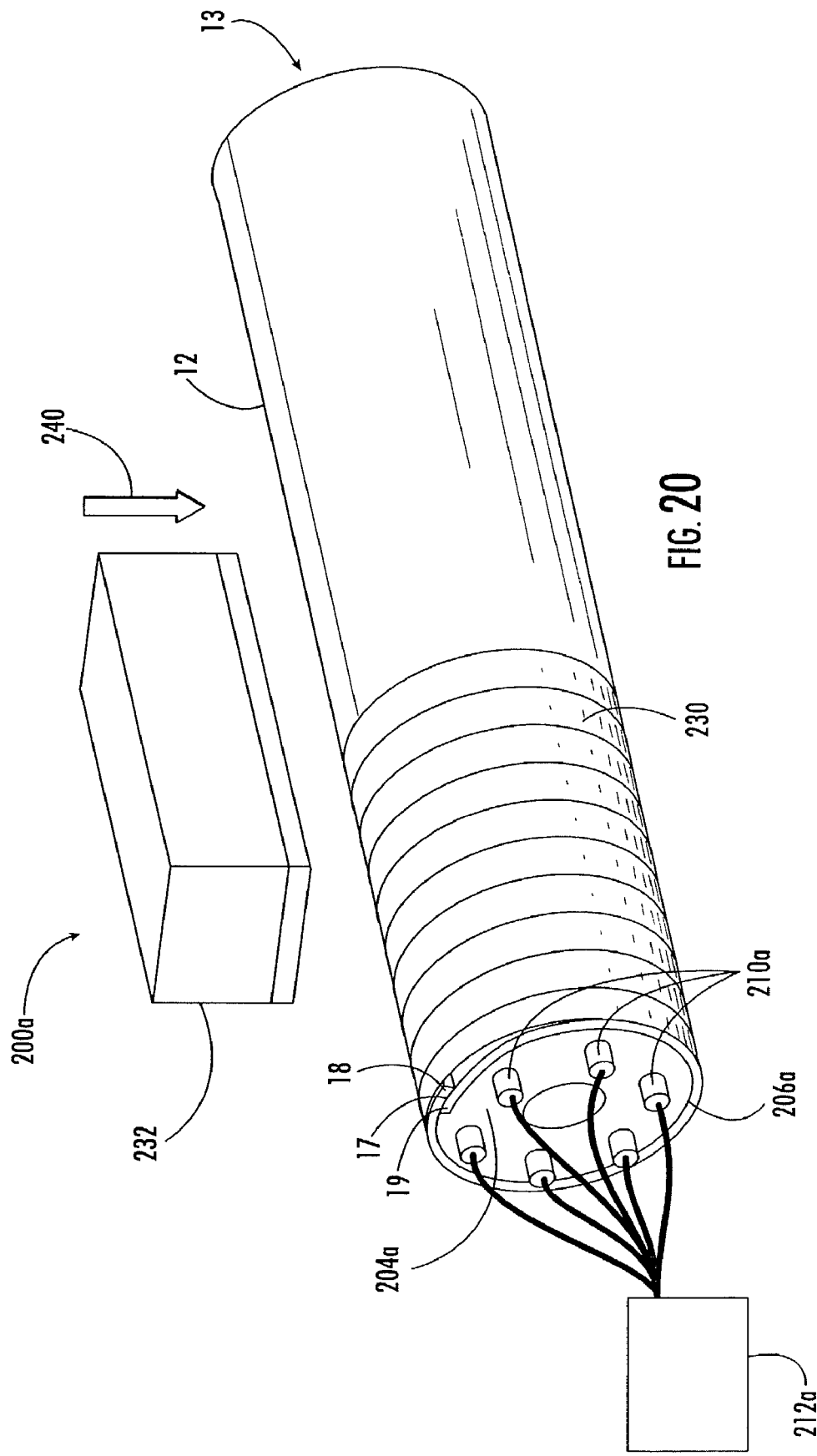
Figure 21:
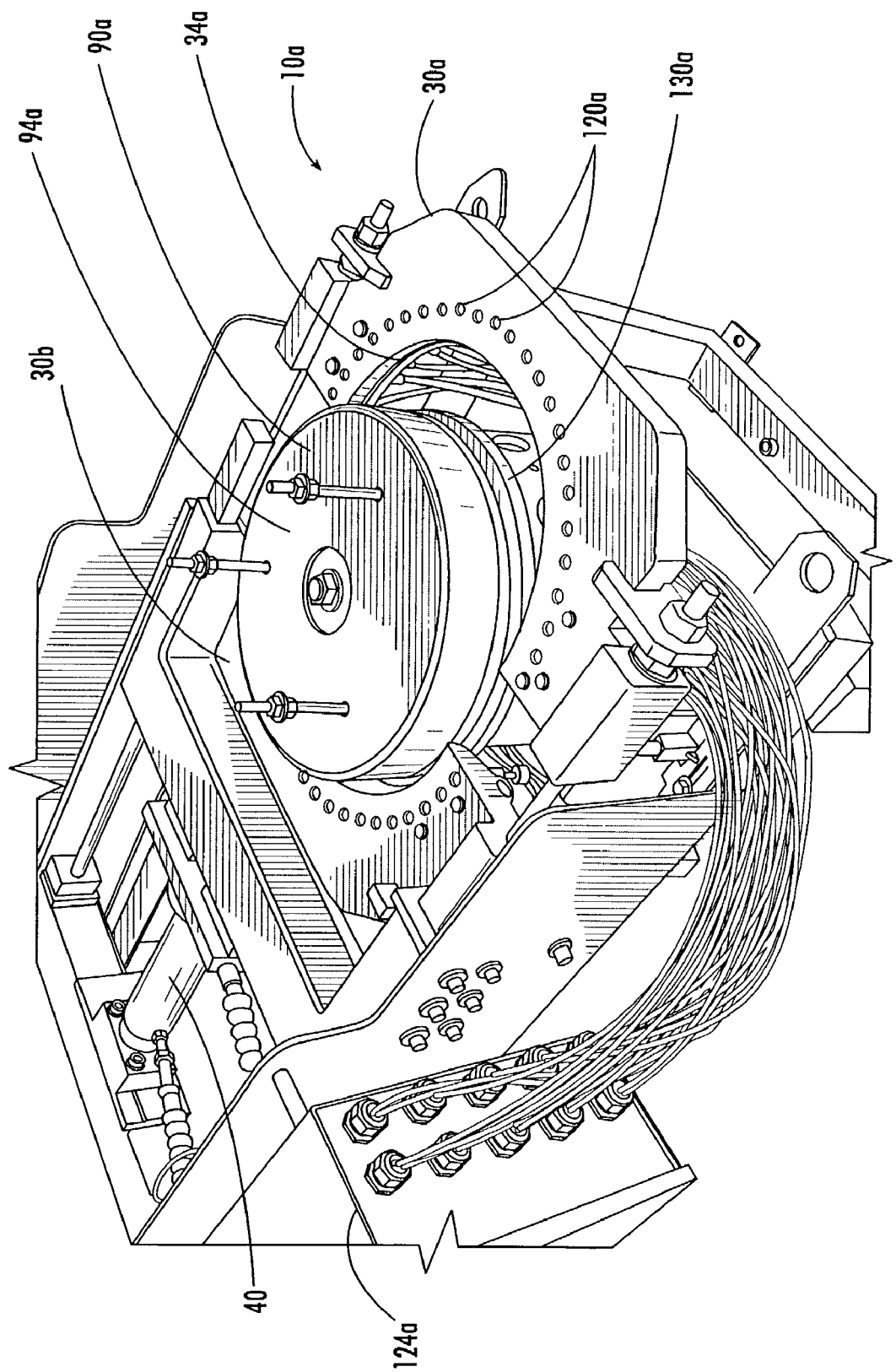

Having thus described the invention in general terms, reference will now be made to the accompanying drawings, which are not necessarily drawn to scale, and wherein:

FIG. 1 is a perspective view of a forming apparatus according to one embodiment of the present invention;

FIG. 2 is a perspective view of a thermoplastic duct with a bead formed according to one embodiment of the present invention;

FIG. 3 is a perspective view of a thermoplastic duct with a bell formed according to one embodiment of the present invention;

FIG. 4 is a perspective view of the mold collar and heater of the forming apparatus of FIG. 1;

FIG. 5 is plan view of the first portion of the mold collar of FIG. 4;

FIG. 6 is an exploded perspective view of the holder of the forming apparatus of FIG. 1;

FIG. 7 is an exploded perspective view of the alignment supports of the forming apparatus of FIG. 1;

FIG. 8 is a perspective view of the first portion of the inner support structure of the forming apparatus of FIG. 1;

FIG. 9 is a perspective view of the second portion of the inner support structure of the forming apparatus of FIG. 1;

FIG. 10 is a section view of the forming apparatus of FIG. 1;

FIG. 11 is a section view of the forming apparatus of FIG. 1 with the second portion of the inner support structure inserted into the first portion from its position in FIG. 10;

FIG. 12 is an elevation view of an inner support structure according to one embodiment of the present invention;

FIG. 13 is a partially cut-away side view of the right side of the inner support structure of FIG. 12;

FIG. 14 is a perspective view of a forming apparatus according to one embodiment of the present invention;

FIG. 15 is a section view of a forming apparatus according to one embodiment of the present invention;

FIG. 15A is a perspective view of the duct with an unjoined portion for forming according to one embodiment of the invention;

FIG. 16 is a perspective view of a forming apparatus according to another embodiment of the present invention;

FIG. 17 is a perspective view of the inner mandrel of the forming apparatus of FIG. 16;

FIG. 18 is a perspective view of the inner mandrel, duct, and elastomeric layer of the forming apparatus of FIG. 16;

FIG. 19 is an exploded view of the outer mandrel of the forming apparatus of FIG. 16;

FIG. 20 is a perspective view of a forming apparatus according to another embodiment of the present invention; and FIG. 21 is a perspective view of a forming apparatus according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, there is shown a forming apparatus 10 for forming features in a thermoplastic member, such as a duct 12 with a passage 13, according to one embodiment of the present invention. For example, the forming apparatus 10 can be used to form beads 14 and/or bells 15 in ducts 12 as shown in FIGS. 2 and 3 respectively. Preferably, the duct 12 is formed of a composite laminate that includes a thermoplastic matrix and a reinforcing material. Thermoplastic materials are characterized by a transition to a plastic state when heated above a glass transition temperature. For example, the duct 12 can be formed of polyetherimide (PEI) or polyphenol sulfide (PPS), both of which can be thermoplastic. Thermoplastic PEI is available under the trade name Ultem®, a registered trademark of General Electric Company. According to one embodiment of the present invention, the duct 12 is formed of a composite material that includes a matrix of thermoplastic PEI that is reinforced with a fabric or fibers that are formed from a reinforcing material such as carbon, glass, or an aramid such as Kevlar®. Alternatively, the duct 12 can be formed of other thermoplastic materials, which can be reinforced by other reinforcing materials, or can include no reinforcing materials. The duct 12 can be used in numerous applications including, but not limited to, environmental control systems of aerospace vehicles, in which air is delivered through the passage 13 of the duct 12 to provide heating, cooling, ventilation, and/or pressurization of an aircraft cabin. The duct 12 can be connected to other ducts or other devices such as ventilators, compressors, filters, and the like. The beads 14 and bells 15 can be used to secure the duct 12 to other ducts and devices. For example, the bead 14 can correspond to an interior contour of a coupling device such as a clamp that is used to join two ducts 12. Similarly, the bell 15 can receive an end of another duct 12, and the two ducts 12 can be held together by friction, glue, fasteners, consolidation joining, or other methods. Additionally, multiple ducts 12 can be connected so that a longitudinal axis of each duct 12 is configured at an angle relative to the longitudinal axis of the adjoining duct(s) 12. Thus, the ducts 12 can be connected to form an intricate duct system (not shown) that includes numerous angled or curved ducts 12 for accommodating the devices connected by the duct system and for meeting layout restrictions as required, for example, on an aircraft where space is limited.

The forming apparatus 10 includes a mold collar 20, which is shown in FIGS. 4 and 5. The mold collar 20 extends longitudinally from a first end 22 to a second end 24 and defines an inner surface 26 directed toward a cavity 28. Preferably, the cavity 28 has a circular cross section and corresponds to the outer diameter of the duct 12, but the cavity 28 can also be non-circular, for example, for forming ducts 12 that have rectangular, triangular, or elliptical cross-section shapes. In this embodiment, the cavity 28 extends through the collar 20 from the first end 22 to the second end 24, but in other embodiments the cavity 28 can extend partially therethrough. The mold collar 20 can include a single monolithic member or multiple members, such as first and second separable portions 30, 32. The portions 30, 32 define holes 36 for receiving bolts (not shown) that connect the portions 30, 32, though other fasteners or clamps can similarly be used. Preferably, the mold collar 20 is formed of a thermally conductive material, such as aluminum, steel, titanium, and alloys thereof, and the portions 30, 32 can be assembled tightly around the duct 12 such that the inner surface 26 of the mold collar 20 contacts the duct 12 and heat can be conducted through the mold collar 20 to the duct 12 during processing. The inner surface 26 of the mold collar 20 defines a mold contour 34, i.e., a contour that corresponds to a desired feature of the duct 12. Preferably, the mold collar 20 defines a continuous mold contour 34 that extends circumferentially around the inner surface 26. For example, the mold contour 34 of the first portion 30 shown in FIG. 5 is a bead shape that corresponds to the desired bead 14 of FIG. 2. With the first and second portions 30, 32 assembled as shown in FIG. 4, the bead shaped mold contour 34 of FIG. 5 is a continuous slot defined by both portions 30, 32 of the mold collar 20 that extends around a longitudinal axis of the mold collar 20. Alternatively, the mold contour 34 can comprise multiple non-continuous sections and can extend longitudinally.

As shown in FIG. 4, an outer heater 50 can be positioned around the mold collar 20. For illustrative clarity, the outer heater 50 and mold collar 20 are shown assembled without the duct 12 in FIG. 4. Preferably, the outer heater 50 is configured to be positioned and secured upon the mold collar 20 such that the outer heater 50 is proximate to and aligned with the mold contour 34. The outer heater 50 can be any of a number of different kinds of heaters and can include a single heating device or multiple heating devices, such electrical resistive heaters. The outer heater 50 can include two separable segments, as shown in FIG. 4, that are secured around the mold collar 20 by bolts or another fastening or clamping mechanism. For example, the outer heater 50 can be an adjustable clamp heater such as a mica band heater available from Heatron, Inc., Leavenworth, Kans. Alternatively, the outer heater 50 can be an integral part of the mold collar 20.

An insulative holder 60, shown in FIG. 6, defines an aperture 68, which is used to support the duct 12 with the mold collar 20 and outer heater 50. The holder 60 can be formed of a phenolic material, i.e., a material formed of a thermoset resin, or other heat resistant materials. Preferably, the holder 60 insulates the mold collar 20 to minimize heat loss from the duct 12 during heating. As illustrated in FIG. 6, the holder 60 can comprise first and second members 62, 64 that can be separated to facilitate the insertion and removal of the duct 12, mold collar 20, and outer heater 50. Bolt holes 66 can receive bolts (not shown) for securing the members 62, 64. The holder 60 can also define an inner contour 70 within the aperture 68 that corresponds to the duct 12, mold collar 20, and/or outer heater 50. For example, the inner contour 70 can define channels, pockets, or other contours that receive at least one of the duct 12, mold collar 20, and outer heater 50. Thus, the aperture 68 and the inner contour 70 can be configured such that the holder 60 retains the duct 12, mold collar 20, and outer heater 50 therein.

Similarly, the holder 60 can be configured to retain one or more longitudinal alignment supports 80, shown individually in FIG. 7. Each support 80 comprises a partial hollow cylinder or another shape that correspond to the outside of the duct 12. Each support 80 also includes a rib 82 or other mechanism for engaging or connecting to the holder 60. The ribs 82 correspond with the inner contour 70 of the holder 60 such that the alignment supports 80 can be configured to align the duct 12, longitudinally in this embodiment, with the mold collar 20. Alternatively, the alignment supports 80 can be connected directly to the mold collar 20. The supports 80 can be formed of a variety of materials including, for example, aluminum, steel, ceramics, polymers, and the like.

The forming apparatus 10 also includes an inner support structure 90, which can be formed of various materials such as aluminum, steel, titanium, and alloys thereof. Preferably, at least part of the inner support structure 90 is formed of a thermally conductive material so that heat can be conducted radially outward to the duct 12 as described below. In one embodiment, the inner support structure 90 includes first and second portions 94, 96 which are separable, as shown in FIGS. 8 and 9, respectively. The first portion 94 defines an outer surface 92 that corresponds to the inside of the duct 12. A bore 98 extends through the inner support structure 90 in order to provide a material savings and to correspondingly reduce the weight, but the bore can also extend only partially through the support structure 90 or be omitted from the support structure 90. The first portion 94 has a face 100 that defines an aperture 102 for receiving the second portion 96. The second portion 96 also defines a face 104 that, when directed toward face 100 of the first portion 94, can be received by the first portion 94. A lip 106 limits the extent to which the second portion 96 can be inserted into aperture 102 of the first portion 94. The second portion 96 also includes one or more studs 108, six shown in FIG. 9, which extend through corresponding holes 110 of the first portion 94 when the second portion 96 is inserted into the first portion 94. Nuts (not shown) can be threaded onto the studs 108 such that the nuts retain the studs 108 in the holes 110 and retain the second portion 96 in the aperture 102 of the first portion 94. The studs 108 also serve to align the first and second portions 94, 96.

An expansion member 130 is disposed on the second portion 96 proximate to the lip 106. When the nuts are tightened on the studs 108, as illustrated by FIGS. 10 and 11, the second portion 96 is pulled further into the aperture 102 of the first portion 94 until the expansion member 130 contacts the face 100 of the first portion 94. Further tightening of the nuts compresses the expansion member 130 in the longitudinal direction between the face 100 and the lip 106. Preferably, the expansion member 130 is formed of an elastomeric material such as rubber, silicon, neoprene, or latex that is elastically deformable. For example, the expansion member 130 can be formed of a moldmaking silicone, such as Shin-Etsu 1300T. Thus, by tightening the nuts, the expansion member 130 can be expanded radially outward from the second member 96 to urge the duct 12 against the mold collar 20.

According to one method of operation, the inner support structure 90 is positioned in the passage 13 of the duct 12 as shown in FIG. 1 such that the outer surface 92 of the first portion 94 is positioned within and contacts the passage 13 of the duct 12. The inner support structure 90 can include a bore (not shown) to receive an alignment guide 38, which extends from the first end 22 of the mold collar 20, so that the inner support structure 90 can be positioned in a predetermined angular position in the duct 12. At least one heater 120 is provided within the passage 13 of the duct 12 to heat the duct 12 during forming. For example, as shown in FIG. 10, rod, or cartridge, heaters 120 are disposed in the first portion 94 of the inner support structure 90 and extend from the face 100 into the aperture 102. One such heater 120 is a 500 watt cartridge heater manufactured by Watlow Electric Manufacturing Company, St. Louis, Mo. Corresponding holes 122 in the second portion 96 of the inner support structure 90 are structured to receive the rod heaters 120. Preferably, the rod heaters 120 extend to a position proximate to the expansion member 130, and the expansion member 130 is positioned at a longitudinal position in the passage 13 of the duct 12 that corresponds to the longitudinal position of the mold contour 34 of the mold collar 20, for example, as shown in FIGS. 10 and 11. Thus, a formation portion 16 of the duct 12, i.e., the portion 16 of the duct 12 that is to be thermoplastically formed to make the bead, is disposed between the expansion member 130 and the mold contour 34 of the mold collar 20, and the rod heaters 120 are positioned proximate to and generally aligned with the formation portion 16 of the duct 12.

The rod heaters 120 can be connected to a power supply 124, and the outer heater 50 can be connected to the power supply 124 or a different source of power. The heaters 50, 120 are preferably energized such that the formation portion 16 of the duct 12 is heated to a formation temperature, such as a temperature higher than the glass transition temperature of the thermoplastic duct 12. For example, in one embodiment, the duct 12 is formed of a composite thermoplastic material comprising PEI reinforced with Kevlar® aramid and has a glass transition temperature of about 417° F. The duct can be formed at temperature less than the glass transition temperature, for example, about 350° F., but preferably is formed at higher temperatures to minimize stress on the reinforcing Kevlar® aramid. For example, in one advantageous embodiment, the duct 12 is formed at a temperature of between about 460° F. and 480° F., for a hold or processing time of between about 20 and 45 minutes.

Before or concurrently with the heating of the formation portion 16 of the duct 12, the expansion member 130 is expanded radially to urge the formation portion 16 of the duct 12 against the mold contour 34. For example, a tightening adjustment of the nuts 109, illustrated by FIG. 11 relative to FIG. 10, results in the radially outward expansion of the expansion member 130. As shown, the tightening of the nuts 109 advances the second portion 96 of the inner support structure 90 into the aperture 102 of the first portion 94, thereby compressing expansion member 130 longitudinally and expanding the expansion member 130 radially against the duct 12. While the duct 12 is at the formation temperature, the expansion member 130 urges the formation portion 16 against the mold contour 34 and thermoplastically forms the formation portion 16 to the desired shape of the duct 12, which defines a bead in this embodiment. After processing at the formation temperature, the duct 12 can be at least partially cooled in the forming apparatus 10, for example, to a temperature less than the glass transition temperature.

In another embodiment of the present invention, illustrated in FIGS. 12 and 13, an inner support structure 140 comprises a single structure that defines a channel 142. Disposed in the channel 142 is an expansion member, which is an elastomeric inflatable bladder 144 defining at least one internal chamber 146. The inflatable bladder 144 is configured to receive a fluid, such as air, into the internal chamber 146 and thereby be expanded radially outwards. Thus, the inner support structure 140 can be positioned within the passage 13 of the duct 12, and the duct 12 can be positioned in the mold collar 20, outer heater 50, and holder 60 as described above in connection with FIG. 1. A fluid source (not shown) can be fluidly connected to the inflatable bladder 144, for example, via the fluid line 146, and heaters 148, similar to the heaters 120 described above, can be connected to a power supply (not shown), for example, via wires 152. The heaters 148 can be used to heat the duct 12, and the inflatable bladder 144 can be used to urge the formation portion 16 of the duct 12 against the mold contour 34 and thereby thermoplastically form the formation portion 16 to the desired shape of the duct 12.

Although the forming apparatus 10 is illustrated in the foregoing figures as a bead forming apparatus, the apparatus 10 can also be used to form other features by changing the configuration of the mold contour 34. For example, the shape of the mold contour 34 can define other continuous shapes extending arcuately around the inner surface 26 of the mold collar 20, one or more non-continuous shapes, longitudinally extending shapes, and the like. Additionally, it is understood that the placement of the duct 12 in the forming apparatus 10 determines the position and, in part, the shape of the resulting feature. Therefore, the duct 12 can be inserted into the forming apparatus 10 according to the desired placement of the feature. For example, as shown in FIG. 10, the first portion 94 of the inner support structure 90 is wider than the duct 12, and the duct 12 does not extend through the first portion 94 but rather is inserted to abut the first portion 94. The duct 12 can also be inserted to a lesser extent, i.e., so that the duct 12 does not abut the first portion 94. Alternatively, the first portion 94 of the inner support 90 can fit within the passage 13 of the duct 12 so that the duct 12 can extend, for example, to the first end 22 of the mold collar 20, or even beyond the mold collar 20. Thus, the inner support structure 90, mold collar 20, or an additional component of the forming apparatus 10 can function as a placement reference for the duct 12 so that the formation portion 16 of the duct 12 is positioned proximate to the mold contour 34 and the feature is imparted onto the duct 12 at the desired location. Further, the positioning of the duct 12 in the forming apparatus 10 can affect the shape of the feature if the duct 12 is inserted such that the formation portion 16 occurs at the end of the duct 12 and only part of the feature is imparted onto the duct 12. For example, the mold contour 34 shown in FIG. 5, which typically forms the bead 14 on the duct 12, can also be used to form a short, outwardly flared, or bell shaped, feature by inserting the duct 12 so that the duct 12 extends only partially through the mold contour 34 and the formation portion 16 occurs at the end of the duct 12.

A bell feature can also be formed according to the present invention using a forming apparatus 150 such as the one shown in FIG. 14. The forming apparatus 150 includes a base structure 152 that supports a mandrel 160 and a clamping mechanism 170. The mandrel 160 is configured within the clamping mechanism 170 such that the duct 12 can be inserted therebetween. As shown in FIG. 15, the mandrel 160 defines an outer surface 162 that tapers from a first diameter $d_1$ to a second, smaller diameter $d_2$. Preferably, the duct 12 corresponds to the second diameter $d_2$ and at least a portion of the duct can be configured to correspond to the larger first diameter $d_1$. For example, as shown in FIG. 15A, the duct 12 can include an interface portion 17 defined by unjoined and overlapping longitudinal edges 18, 19 of the duct 12, e.g., a portion of the edges 18, 19 that were left unjoined in a prior joining process as discussed in U.S. application Ser. No. 10/215,833, titled "Consolidation Joining of Thermoplastic Laminate Ducts," filed concurrently herewith, the entirety of which is incorporated by reference. The unjoined edges 18, 19 allow the duct 12 to be inserted onto the mandrel 160 and configured, at least partially, to the first diameter $d_1$.

The mandrel includes a heater 164 disposed in the wall of the mandrel 160, though in other embodiments, the heater 164 can instead be positioned within a central bore 166 of the mandrel 160 or otherwise located in the apparatus 150. The clamping mechanism 170 at least partially surrounds the mandrel 160, and the duct 12 can be inserted axially into the apparatus 150, e.g., from the right in FIG. 15, so that the passage 13 of the duct 12 receives the mandrel 160, and the duct 12 is retained tightly between the clamping mechanism 170 and the mandrel 160. The base structure 152, the clamping mechanism 170, and the mandrel 160 can be formed of any material with sufficient strength for supporting the duct 12 during processing, for example, aluminum, steel, titanium, and alloys thereof.

Preferably, the inner surface 174 of the clamping mechanism 170 is defined by an elastomeric layer 176 such that the elastomeric layer 176 can be urged radially toward the duct 12 and retained between the clamping mechanism 170 and the mandrel 160. The heater 164 is configured to heat the duct 12 to a formation temperature, e.g., the glass transition temperature, and the elastomeric layer 176 preferably can be expanded to urge the duct 12 against outer surface 174 of the mandrel. For example, the elastomeric layer 176 can comprise a heat expandable material that is axially restrained by end plates 178. With the duct 12 positioned in the forming apparatus 150, the heater 164 can be used to heat the formation portion 16 of the duct 12 to a formation temperature and heat the heat expandable elastomeric layer 176. The elastomeric layer 176 expands radially and forces the duct 12 against the mandrel 160. Thus, the duct 12 is thermoplastically formed to the shape of the outer surface 162 of the mandrel 160, for example, the bell 15. In other embodiments, the elastomeric layer 176 can instead comprise an inflatable member similar to the inflatable bladder 144 described above. The elastomeric layer 176 can also comprise a solid elastomer, and the forming apparatus 150 can include a mechanism for compressing the elastomer, for example, in the axial direction, to thereby expand the elastomer radially inwards. Additionally, the interface portion 17 of the duct 12 can be heated to at least the glass transition temperature and the longitudinal edges 18, 19 can be consolidation joined by the compressive force exerted thereon by the elastomeric layer 176 as described in U.S. application Ser. No. 10/215,833, titled "Consolidation Joining of Thermoplastic Laminate Ducts."

According to another embodiment of the present invention, an alternative forming apparatus 200, illustrated in FIGS. 16–19, can be used to at least partially encapsulate the duct 12, heat the duct 12 to a forming temperature, and form the duct 12 against an inner mandrel 204. As shown in FIG. 17, the inner mandrel 204 has an outer surface 206 that corresponds to the desired shape of the duct 12. In the illustrated embodiment, the outer surface 206 defines a bell shape, though other mold contours and shapes can similarly be provided including beads, ribs, channels, and the like. Bores 208 in the inner mandrel 204 are configured to receive rod or cartridge heaters 210, which are connected to a power supply 212, and generate resistive heat. The inner mandrel 204 is inserted into the duct 12 as shown in FIG. 18, and an elastomeric layer 214 is disposed over the duct 12. The elastomeric layer 214 preferably is formed of a heat resistant material that elastically expands when heated, and can be preformed to a hollow cylindrical shape as shown. An outer mandrel 216, which can comprise separable sections as shown in FIG. 19, is then configured to surround the elastomeric layer 214. The outer mandrel 216 is secured in a base support structure 218, as shown in FIG. 16, which includes end plates 220, that are secured by bolts 222 or other fasteners. Preferably, the inner mandrel 204 is formed of a thermally conductive material, such as aluminum, steel, titanium, or alloys thereof, to conduct heat radially outward from the heaters 210 to the duct 12. The outer mandrel 216 and base support structure 218 are preferably sufficiently rigid to support the duct 12 during processing, and the elastomeric layer 214 and/or the outer mandrel 216 can be thermally insulative to reduce heat loss from the forming apparatus 200.

During operation, the heaters 210 are connected to the power supply 212 and heat the duct to the formation temperature. The elastomeric layer 214 expands radially between the outer mandrel 216 and the duct 12, and preferably provides sufficient expansive force at the formation temperature to urge the duct 12 against the outer surface 206 of the inner mandrel 204. Additionally, the interface portion 17 of the duct 12 can be heated above the glass transition temperature, and the elastomeric layer 214 can consolidation join the edges 18, 19 as discussed above in connection with FIG. 15. After a holding period at the formation temperature, the duct 12 can be at least partially cooled in the forming apparatus 200, for example, to a temperature less than the glass transition temperature.

The clamping mechanism 170 and the outer mandrel 216 of the apparatuses 150, 200, respectively, can comprise a variety of devices that resist the radial force of the elastomeric layers 176, 214. For example, tape (not shown) can be disposed on the exterior of either of the elastomeric layers 176, 214 before the elastomeric layer 176, 214 is heated. Preferably, the tape is sufficiently inelastic so that the tape resists the outwardly radial expansion of the elastomeric layer 176, 214 forcing the elastomeric layer 176, 214 to expand radially inward against the duct 12.

Alternatively, heat shrinkable tape 230 can be used to configure the duct 12 to the desired configuration. As shown in FIG. 20, a forming apparatus 200a can be configured by positioning a rigid inner support structure 204a, similar to the inner mandrel 204, longitudinally in the passage 13 of the duct 12 so that an outer surface 206a of the support structure 204 corresponds to the formation portion 16 of the duct 12. For example, the outer support surface 206a can define a bell section, as shown in FIG. 20, a bead, or the like. The heat shrinkable tape 230 is disposed circumferentially around the formation portion 16 of the duct 12, and the tape 230 can be disposed in one or more layers on the duct 12. In operation, the tape 230 and the duct 12 can be heated by heaters 210a, which are connected to a power supply 212a. Preferably, the tape 230 is configured to shrink when heated to the formation temperature of the duct 12 so that the tape 230 contracts in length and urges the formation portion 16 of the duct 12 radially inward against the support structure 204a. Further, as shown in FIG. 20, the forming apparatus 200a can include a consolidation joining head 232, which extends longitudinally and is adapted to be adjusted radially inward against the interface portion 17 of the duct 12, i.e., in a direction indicated by reference numeral 240. The head 232 is preferably configured to urge the interface portion 17 against the support structure 204a and heat the interface portion 17 to at least a glass transition temperature of the duct 12, thereby consolidation joining the edges 18, 19 at the interface portion 17, as provided in U.S. application Ser. No. 10/215,833, titled "Consolidation Joining of Thermoplastic Laminate Ducts." The head 232 can comprise numerous types of heaters, for example, a flexible heater disposed on an elastomeric block, as discussed in U.S. Application Ser. No. 10/215,815, entirety of which is incorporated by reference."

While the above forming apparatuses 10, 150, 200, 200a are generally described as manually operated devices, each apparatus 10, 150, 200, 200a can also be automated or partially automated. For example, FIG. 21 illustrates a forming apparatus 10a similar to the forming apparatus 10 above. The forming apparatus 10a includes at least one hydraulic actuator 40 for actuating die halves 30a, 30b. Like the mold collar 20 described previously, the die halves 30a, 30b define a mold contour 34a, which corresponds to a desired configuration of the duct 12. The die halves 30a, 30b also support a plurality of heaters 120a, which are connected to a power supply 124a and heat the duct 12 during processing. The first actuator 40 is configured to adjust at least one of the die halves 30a, 30b to an open position relative to an inner support structure 90a so that a duct 12 can be inserted into the forming apparatus 10a and to a closed position so that the duct 12 can be retained between the die halves 30a, 30b and the inner support structure 90a. A second actuator (not shown) is configured to adjust a first portion 94a and/or a second portion (not shown) of the inner support structure 90a to thereby expand an expansion member 130a, as described above in connection with FIGS. 10 and 11. Similarly, actuators can be used to control other functions of the forming apparatuses 10, 150, 200.

The duct 12 can be formed from a preform (not shown) comprising a flat sheet of thermoplastic laminate, which defines connection features for connecting spuds, brackets, and the like to the duct 12. The preform can define a geometric pattern that corresponds to a desired shape or configuration of the duct 12, and the geometric pattern can be determined by projecting the desired shape of the duct 12 onto a flat laminate sheet. Methods and apparatuses for forming preforms and for determining geometric patterns that correspond to ducts are provided in U.S. application Ser. No. 10/216,110, titled "Thermoplastic Laminate Duct," filed concurrently herewith, the entirety of which is incorporated herein by reference. It is also appreciated that marks can be provided on the preform, for example, to accurately identify the location of post-formed features such as bead and bells or to facilitate the manufacture or assembly of the ducts, as also provided in U.S. application Ser. No. 10/216,110, titled "Thermoplastic Laminate Duct."

The preform can be bent, or preformed, to the desired shape of the duct and longitudinal ends of the preform can be joined to form the duct. Methods and apparatuses for configuring preforms to the bent, or preformed, configuration are provided in U.S. application Ser. No. 10/215,815, titled "Preforming Thermoplastic Ducts." Methods and apparatuses for consolidation joining preforms to form ducts are provided in U.S. application Ser. No. 10/215,833, titled "Consolidation Joining of Thermoplastic Laminate Ducts."

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for thermoplastically forming a contour in a thermoplastic duct defining a passage, the apparatus comprising:
 a collar extending longitudinally from a first end to a second end and having an inner surface extending at least partially between said first and second ends, said inner surface defining a cavity;
 an inner support structure extending longitudinally in said cavity of said collar and having an outer surface opposing said inner surface of said collar;
 a plurality of heaters extending at least partially through said inner support structure and configured to heat a formation portion of the duct to at least a formation temperature; and
 an expansion member disposed between said inner and outer surfaces and extending at least partially around said inner support structure,
 wherein said collar defines a mold contour, said expansion member is formed of an elastomeric material and said inner support structure defines a channel for receiving said expansion member, a width of said channel being adjustable in the longitudinal direction of said collar to compress said expansion member in the longitudinal direction and urge said expansion member radially toward said mold contour such that said expansion member is configured to urge a formation portion of the duct against said mold contour and thereby thermoplastically form the duct.

2. An apparatus for thermoplastically forming a contour according to claim 1, wherein said inner support structure comprises a first portion and a second portion, said first portion defining a face directed in the longitudinal direction and an aperture in said face configured to at least partially and longitudinally receive said second portion, said second portion and said face defining said channel for receiving said expansion member, such that insertion of said second portion into said first portion adjusts the width of said channel.

3. An apparatus for thermoplastically forming a contour according to claim 2, further comprising an actuator for adjusting at least one of said portions of said inner support structure to expand said expansion member.

4. An apparatus for thermoplastically forming a contour in a thermoplastic duct defining a passage, the apparatus comprising:
 a collar extending longitudinally from a first end to a second end and having an inner surface extending at least partially between said first and second ends, said inner surface defining a cavity;
 a rigid inner support structure extending longitudinally in said cavity of said collar, having an outer surface opposing said inner surface of said collar, and including a first portion and a second portion, said first portion defining a face directed in the longitudinal direction, an aperture in said face being configured to at least partially and longitudinally receive said second portion;
 at least one heater extending at least partially through said inner support structure and configured to be disposed within the passage of the duct and configured to heat a formation portion of the duct to at least a formation temperature; and
 an elastomeric expansion member disposed between said inner and outer surfaces and extending at least partially around said inner support structure,
 wherein said inner surface of said collar defines a mold contour and said second portion and said face define a channel for receiving said expansion member, such that insertion of said second portion into said first portion adjusts the width of said channel and thereby expands said expansion member radially and urges the formation portion of the duct radially outward against said mold contour to thermoplastically form the duct.

5. An apparatus for thermoplastically forming a contour according to claim 4, further comprising an actuator for adjusting at least one of said portions of said inner support structure to expand said expansion member.

6. An apparatus for thermoplastically forming a contour according to claim 4, wherein said at least one heater comprises a plurality of heaters extending at least partially through said inner support structure.

7. An apparatus for thermoplastically forming a contour according to claim 4, further comprising at least one heater positioned radially outside said cavity of said collar and configured to radiate heat radially inward to the duct.

8. An apparatus for thermoplastically forming a contour according to claim 4, further comprising an alignment device configured to support the duct such that a longitudinal axis of the duct is collinear with a longitudinal axis defined by said collar.

* * * * *